United States Patent
Lee et al.

(10) Patent No.: US 11,618,710 B2
(45) Date of Patent: Apr. 4, 2023

(54) NANO PROTRUSION SURFACE FORMING METHOD AND BASE MATERIAL HAVING NANO PROTRUSION SURFACE FORMED BY METHOD

(71) Applicant: SEP, INC., Anyang-si Gyeonggi-do (KR)

(72) Inventors: Sang Ro Lee, Anyang-si (KR); Yun Hwan Kim, Seoul (KR); Jae Hyung Seo, Busan (KR); Ki Hun Kim, Anyang-si (KR); Ji Young Lee, Seoul (KR)

( * ) Notice: Subject to any disclaimer, the term of this patent is extended or adjusted under 35 U.S.C. 154(b) by 0 days.

(21) Appl. No.: 16/323,911

(22) PCT Filed: Aug. 2, 2017

(86) PCT No.: PCT/KR2017/008349
§ 371 (c)(1),
(2) Date: Feb. 7, 2019

(87) PCT Pub. No.: WO2018/030703
PCT Pub. Date: Feb. 15, 2018

(65) Prior Publication Data
US 2020/0189966 A1    Jun. 18, 2020

(30) Foreign Application Priority Data

Aug. 8, 2016    (KR) .................. 10-2016-0100877
Aug. 8, 2016    (KR) .................. 10-2017-0043110

(51) Int. Cl.
*C03C 15/00*    (2006.01)
*G02B 1/118*    (2015.01)

(52) U.S. Cl.
CPC .............. *C03C 15/00* (2013.01); *G02B 1/118* (2013.01); *G02B 2207/101* (2013.01)

(58) Field of Classification Search
None
See application file for complete search history.

(56) References Cited

U.S. PATENT DOCUMENTS

| 2010/0246016 | A1* | 9/2010 | Carlson | .................... | C09G 1/00 |
| | | | | | 359/599 |
| 2013/0107370 | A1* | 5/2013 | Lander | ................. | C09D 133/12 |
| | | | | | 359/609 |

(Continued)

FOREIGN PATENT DOCUMENTS

| JP | 5393087 B2 | 1/2014 |
| KR | 10-2002-0031489 A | 5/2002 |

(Continued)

OTHER PUBLICATIONS

Written Opinion, dated Nov. 9, 2017, for International Application No. PCT/KR2017/008349.

(Continued)

*Primary Examiner* — Shamim Ahmed
(74) *Attorney, Agent, or Firm* — Apex Juris PLLC; Tracy M Heims

(57) ABSTRACT

The present invention relates to a nano-protrusion forming method and a base material having a nano-protrusion surface formed by the method. The method includes forming an anti-reflective layer including nano-protrusions having a width of several nm to several tens of nm, and/or an anti-glare layer including protrusions having a width of several tens of nm to several μm, by a wet etching process using an acid solution without using a nano-mask.

10 Claims, 8 Drawing Sheets

(56) References Cited

U.S. PATENT DOCUMENTS

| | | | | |
|---|---|---|---|---|
| 2013/0164521 | A1* | 6/2013 | Myoung | G02F 1/133308 |
| | | | | 428/312.6 |
| 2015/0175478 | A1* | 6/2015 | Ravichandran | C03C 15/00 |
| | | | | 428/141 |
| 2015/0249424 | A1* | 9/2015 | Hody Le Caer | B32B 17/06 |
| | | | | 136/251 |
| 2017/0369362 | A1* | 12/2017 | Chen | C03C 15/00 |
| 2019/0107751 | A1* | 4/2019 | Bazemore | G02B 5/0294 |

FOREIGN PATENT DOCUMENTS

| | | |
|---|---|---|
| KR | 10-2005-0100485 A | 10/2005 |
| KR | 10-0928330 B1 | 11/2009 |
| KR | 10-2011-0032432 A | 3/2011 |
| KR | 10-2012-0014879 A | 2/2012 |
| KR | 10-2012- 0023632 A | 3/2012 |
| KR | 10-1360821 B1 | 2/2014 |
| KR | 10-2014-0113116 A | 9/2014 |

OTHER PUBLICATIONS

Search Report, dated Nov. 9, 2017, for International Application No. PCT/KR2017/008349.

* cited by examiner

NANO PROTRUSION SURFACE FORMING METHOD AND BASE MATERIAL HAVING NANO PROTRUSION SURFACE FORMED BY METHOD

CROSS-REFERENCE TO RELATED APPLICATIONS

The present application is a U.S. National Phase entry from International Application No. PCT/KR2017/008349, filed Aug. 2, 2017, which claims priority to Korean Patent Application Nos. 10-2016-0100877, filed Aug. 8, 2016, and 10-2017-0043110, filed Aug. 8, 2016, the disclosures of which are incorporated by reference herein in their entirety.

BACKGROUND

1. Technical Field

The proposed invention relates to a method of forming nano-protrusions on a base material (a glass substrate or a polymer film substrate having glassy characteristics), and more particularly to a mask-free wet nano-patterning method of forming protrusions having a width of several nm to several tens of nm or several tens of nm to several μm on the surface of a base material by a wet etching process without using a mask as a selective etch-blocking means, and a base material having a nano-protrusion surface formed by the method.

2. Description of Related Art

Etching processes in semiconductor fabrication can be divided into wet etching and dry etching. The wet etching is generally performed by a chemical reaction between an etching solution having etching dissolving properties and a base material to be etched. The wet etching is isotropic etching in which the etch rates in the vertical and horizontal directions are same. The dry etching is an etching process that uses a reaction with gas plasma or activated gas. The dry etching is anisotropic etching in which the etch rates in the vertical and horizontal directions are different.

In conventional surface treatment, the above-described dry etching should be used to form a pattern having a width of several nm to several tens of nm. However, the dry etching process is more expensive than wet etching, is difficult to control, and is not advantageous for mass production. In addition, the dry etching process is difficult to apply to curved glass and large-area glass, due to its characteristics.

A conventional wet etching process is easier to control than dry etching and is advantageous for mass production. However, patterns formed by wet etching have an average width of 3 μm or more.

In recent years, in various kinds of display devices including mobile devices such as smart phones, the importance of anti-reflection treatment of optical glass and optical films has gradually increased, and nanopatterning technology for achieving anti-reflection has attracted attention. However, this technology has not been put to practical use, because it is complicated, requires an expensive nano-mask, and is difficult to apply for the treatment of curved surfaces or large-area surfaces.

As a method for solving these problems, a technology has been required, which requires no mask and is capable of forming patterns having a width of several nm to several μm by not dry etching but a wet etching process.

SUMMARY

An object of the proposed invention is to form nano-protrusions having a width of several nm to several tens of nm or several tens of nm to several μm by a wet etching process.

Another object of the proposed invention is to produce an anti-glare glass or an anti-glare polymer film having glassy characteristics through a wet etching process.

Still another object of the proposed invention is to produce an anti-reflective glass or an anti-reflective polymer film having glassy characteristics through a wet etching process.

Yet another object of the proposed invention is to produce an anti-glare and anti-reflective glass or an anti-glare and anti-reflective polymer film having glassy characteristics through a wet etching process.

A protrusion forming method according to the present invention comprises a step of forming protrusions on a glass substrate or a polymer film substrate having glass characteristics by wet etching.

In one aspect, the step of forming the protrusions comprises a step of forming an anti-glare layer including protrusions having a width of several tens of nm to several μm by wet etching using an acid solution.

At this time, the acid solution may contain fluorine-based acid and nitric acid.

The acid solution may also contain hydrogen fluoride and nitric acid, and may further contain at least one of ammonium fluoride, phosphoric acid and hydrochloric acid.

The content of hydrogen fluoride in the acid solution may be 10 wt % or less.

The content of nitric acid in the acid solution may be 10 wt % or more and 25 wt % or less.

When the acid solution contains ammonium fluoride, the content of the ammonium fluoride may be 5 wt % or less.

When the acid solution contains phosphoric acid, the content of the phosphoric acid may be 5 wt % or less.

When the acid solution contains hydrochloric acid, the content of the hydrochloric acid may be 10 wt % or less.

In addition, the acid solution may also comprise, based on 100 wt % of the acid solution, 10 wt % or less of hydrogen fluoride, 5 wt % or less of ammonium fluoride, 10 wt % or more to 25 wt % or less of nitric acid, 5 wt % or less of phosphoric acid, 10 wt % or less of hydrochloric acid, and the remainder being water.

In another aspect, the step of forming the protrusions comprises a step of forming an anti-reflective layer including protrusions having a width of several nm to several tens of nm by wet etching with an acid solution.

At this time, the acid solution may contain fluorine-based acid.

The acid solution may also contain hydrogen fluoride, and may further contain at least one of ammonium fluoride, phosphoric acid, nitric acid and hydrochloric acid.

The content of the hydrogen fluoride may be more than 0 wt % and not more than 10 wt % based on 100 wt % of the acid solution.

When the acid solution contains ammonium fluoride, the content of the ammonium fluoride may be 5 wt % or less.

When the acid solution contains nitric acid, the content of the nitric acid may be 5 wt % or less.

When the acid solution contains phosphoric acid, the content of the phosphoric acid may be 5 wt % or less.

When the acid solution contains hydrochloric acid, the content of the hydrochloric acid may be 10 wt % or more and 40 wt % or less.

The acid solution may also comprise, based on 100 wt % of the acid solution, 10 wt % or less of hydrogen fluoride, 5 wt % or less of ammonium fluoride, 5 wt % or less of nitric acid, 5 wt % or less of phosphoric acid, 10 wt % or more to 40 wt % or less of hydrochloric acid, and the remainder being water.

In still another aspect, the step of forming the protrusions comprise the steps of: forming an anti-glare layer including protrusions having a width of several tens of nm to several μm by first wet etching using an acid solution; and forming an anti-reflective layer including protrusions having a width of several nm to several tens of nm on the anti-glare layer by second wet etching using an acid solution.

Meanwhile, the base material having the nano-protrusion surface formed by the method according to the present invention may be a base material having a plurality of protrusions formed on the surface thereof, wherein the protrusions are formed by wet etching, the wet etching is performed without a process of forming a selective etch-blocking means such as a mask before the etching, and a state in which the protrusions are formed has no regularity in the mutual position of the protrusions and the size or shape of the protrusions because the selective etch-blocking means such as the mask is not formed.

Advantageous Effects

According to the proposed invention, nano-protrusions having a width of several nm to several tens of nm or several tens of nm to several μm may be formed through a wet etching process.

According to the proposed invention, an anti-glare glass or an anti-glare polymer film having glassy characteristics may be formed through a wet etching process.

According to the proposed invention, an anti-reflective glass or an anti-reflective polymer film having glassy characteristics may be formed through a wet etching process.

According to the proposed invention, an anti-glare and anti-reflective glass or an ant-glare and anti-reflective polymer film having glassy characteristics may be formed through a wet etching process.

DETAILED DESCRIPTION OF THE INVENTION

Figure 1:
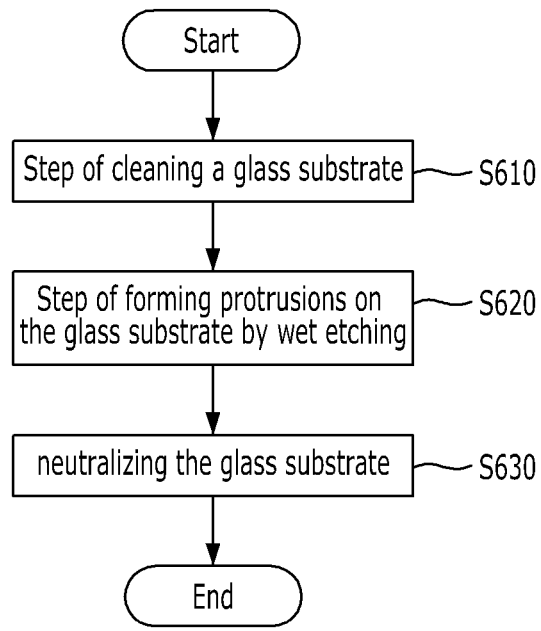
FIG. 1 is an overall flow chart showing a protrusion forming method according to one embodiment.

The above and additional aspects will become more apparent from embodiments which will be described with reference to the accompanying drawings. It is understood that the components of each embodiments may be combined in various manners in one embodiment, unless otherwise stated or mutually contradictory. Furthermore, the proposed invention may be embodied in various different forms and is not limited to the embodiments described herein.

In the drawings, parts not related to the description are omitted in order to clearly describe the proposed invention, and like reference numerals designate like parts throughout the specification. Furthermore, it is understood that, when any part is referred to as "comprising" any component, it does not exclude other components, but may further comprise other components, unless otherwise specified. For example, although the present invention is described below with an emphasis on a glass substrate, it also includes a polymer film having glassy characteristics as described above.

FIG. 1 is an overall flow chart showing a protrusion forming method according to one embodiment of the present invention.

In one embodiment, the protrusion forming method comprises the steps of: (S610) cleaning a glass substrate; (S620) forming protrusions on the glass substrate by wet etching; and (S630) neutralizing the glass substrate.

In one embodiment, the step (S610) of cleaning the glass substrate removes organic matter from the glass substrate, so that acid treatment with an acid solution the step (S620) of forming protrusion on the glass substrate by wet etching which is a subsequent process will be performed uniformly throughout the substrate. For cleaning of the glass substrate, IPA (isopropyl alcohol) or ethanol is used. After the glass substrate is cleaned with IPA (isopropyl alcohol) or ethanol, it is cleaned with water. In the cleaning process, the glass substrate may be cleaned using ultrasonic waves or a brush.

According to one embodiment, the step (S620) of forming protrusions on the glass substrate by wet etching is performed by dipping the glass substrate in an acid solution or spraying the acid solution onto the glass substrate. In the step (S620) of forming protrusions, protrusions are formed on the glass substrate or a polymer film substrate having glassy characteristics by wet etching using an acid solution in the absence of a mask. The step (S620) of forming protrusions on the glass substrate by wet etching will be described later in detail.

According to one embodiment, in the step (S630) of neutralizing the glass substrate, the surface of the glass substrate with reduced pH, which results from the step (S620) of forming protrusions on the glass substrate by wet etching, is maintained at neutral pH. For example, the glass substrate with reduced pH, which results from the step (S620) of forming protrusions on the glass substrate by wet etching, is immersed in a water bath, thereby neutralizing the acid.

Figure 2:
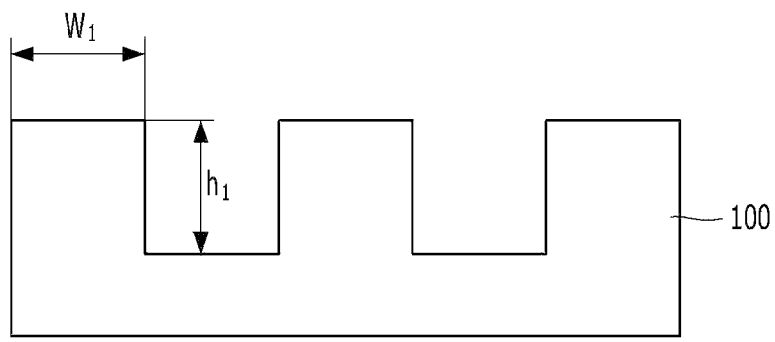
FIG. 2 shows a sectional view of a glass substrate in which an anti-glare layer is formed according to one embodiment.

FIG. 2 shows a sectional view of a glass substrate in which an anti-glare layer is formed according to one embodiment.

In one embodiment, the step of forming the protrusions comprises a step of forming an anti-glare layer including protrusions having a width ($W_1$) of several tens of nm to several μm by wet etching using an acid solution. As shown in FIG. 2, the protrusions include concave and convex surfaces. The width ($W_1$) is the width of the convex surface. The protrusions having a width ($W_1$) of several tens of nm to several μm, formed by wet etching using an acid solution, have a height ($h_1$) of several tens of nm to several μm. If the protrusions having a width ($W_1$) of several tens of nm to several μm are present on the surface of the glass substrate, light irradiated onto the glass substrate will be scattered by the protrusions having a width ($W_1$) of several tens of nm to several μm, and thus the reflectance of the glass substrate will be lowered, thereby reducing glare.

In one embodiment, the acid solution contains fluorine-based acid and nitric acid. Examples of the fluorine-based acid include hydrogen fluorine (HF), ammonium fluoride ($NH_4F$) and the like. By wet etching using an acid solution containing fluorine-based acid and nitric acid, protrusions having a width of several tens of nm to several μm can be formed on the glass substrate.

In one embodiment, the acid solution contains hydrogen fluoride (HF) and nitric acid ($HNO_3$), and may further contain at least one of ammonium fluoride ($NH_4F$), phosphoric acid ($H_3PO_4$), hydrochloric acid (HCl), and water ($H_2O$).

In one embodiment, the content of the hydrogen fluoride may be more than 0 wt % and 10 wt % or less based on 100 wt % of the acid solution.

The chemical reaction equations shown below theoretically explain a process in which nano-protrusions are formed according to the present invention. Even if a portion of the chemical reaction process differs, there is no change in the result of formation of nano-protrusions and the effect obtained therefrom.

$$SiO_2 + 6HF \rightarrow H_2SiF_6 + 2H_2O \quad \text{Chemical reaction equation 1}$$

As shown in chemical reaction equation 1 above, silicon dioxide reacts with hydrogen fluoride to cause etching of the surface of the glass substrate, and as a result, protrusions having a width of several nm to several tens of nm are formed on the glass substrate.

In one embodiment, the content of the nitric acid may be 10 wt % or more and 25 wt % or less based on 100 wt % of the acid solution. The nitric solution whose content is 10 wt % or more and 25 wt % or less based on 100 wt % of the acid solution reacts with aluminum oxide, thereby forming protrusions having a width of several tens of nm to several μm on the glass substrate including the protrusions having a width of several nm to several tens of nm, formed by the above-described process.

$$6HNO_3 + Al_2O_3 \rightarrow 2Al(NO_3)_3 + 3H_2O \quad \text{Chemical reaction equation 2}$$

According to chemical reaction equation 2 above, nitric acid flows into the grooves produced by the etching according to the above-described chemical reaction equation 1, and reacts with aluminum oxide ($Al_2O_3$). According to this reaction, protrusions having a width of several tens of nm to several μm, which are greater than the protrusions formed by hydrogen fluoride, are formed on the glass substrate. As the content of the nitric acid increases in the range of 10 wt % or more to 25 wt % or less based on 100 wt % of the acid solution, protrusions having a greater height and a greater width can be formed on the glass substrate.

In one embodiment, the acid solution contains ammonium fluoride, and the content of the ammonium fluoride may be more than 0 wt % and not more than 5 wt % based on 100 wt % of the acid solution.

$$NH_4F \leftrightarrow NH_3 + HF \quad \text{Chemical reaction equation 3}$$

Although hydrogen fluoride decreases according to the above-described chemical reaction equation 1, hydrogen fluoride is produced according to chemical reaction equation 3. Accordingly, the content of hydrogen fluoride in the acid solution is maintained at a constant level. As the content of hydrogen fluoride is maintained at a constant level, the wet etching process can be stably performed.

In one embodiment, the acid solution contains phosphoric acid, and the content of the phosphoric acid may be more than 0 wt % and not more than 5 wt % based on 100 wt % of the acid solution.

$$2H_3PO_4 + Al_2O_3 \rightarrow 2Al(PO_4) + 3H_2O \quad \text{Chemical reaction equation 4}$$

According to chemical reaction equation 4 above, phosphoric acid reacts with aluminum oxide ($Al_2O_3$), thereby smoothing the surface of the protrusions having a rough surface. Phosphoric acid is more viscous than nitric acid, and thus can smooth the surface of the protrusions formed according to the chemical reaction of nitric acid.

In one embodiment, the acid solution contains hydrochloric acid, and the content of the hydrochloric acid may be more than 0 wt % and not more than 10 wt % based on 100 wt % of the acid solution.

$$SiO_2 + 4HCl \rightarrow SiCl_4 + 2H_2O \quad \text{Chemical reaction equation 5}$$

According to chemical reaction equation 5 above, hydrochloric acid reacts with silicon dioxide ($SiO_2$), thereby smoothing the surface of the protrusions having a rough surface.

In one embodiment, the acid solution contains water, hydrogen fluoride, ammonium fluoride, phosphoric acid, nitric acid, and hydrochloric acid. In this case, the content of the hydrogen fluoride may be more than 0 wt % and not more than 10 wt % based on 100 wt % of the acid solution; the content of the ammonium fluoride may be more than 0 wt % and not more than 5 wt % based on 100 wt % of the acid solution; the content of the nitric acid may be 10 wt % or more and 25 wt % or less based on 100 wt % of the acid solution; the content of the phosphoric acid may be more than 0 wt % and not more than 5 wt % based on 100 wt % of the acid solution; the content of the hydrochloric acid may be more than 0 wt % and not more than 10 wt % based on 100 wt % of the acid solution; and the remainder is water.

By a wet etching process using the acid solution containing the above-described amounts (wt %) of water, hydrogen fluoride, ammonium fluoride, phosphoric acid, nitric acid and hydrochloric acid, protrusions having a width of several tens of nm to several μm are formed on the glass substrate. The water serves to dilute the acid solution.

Figure 3:
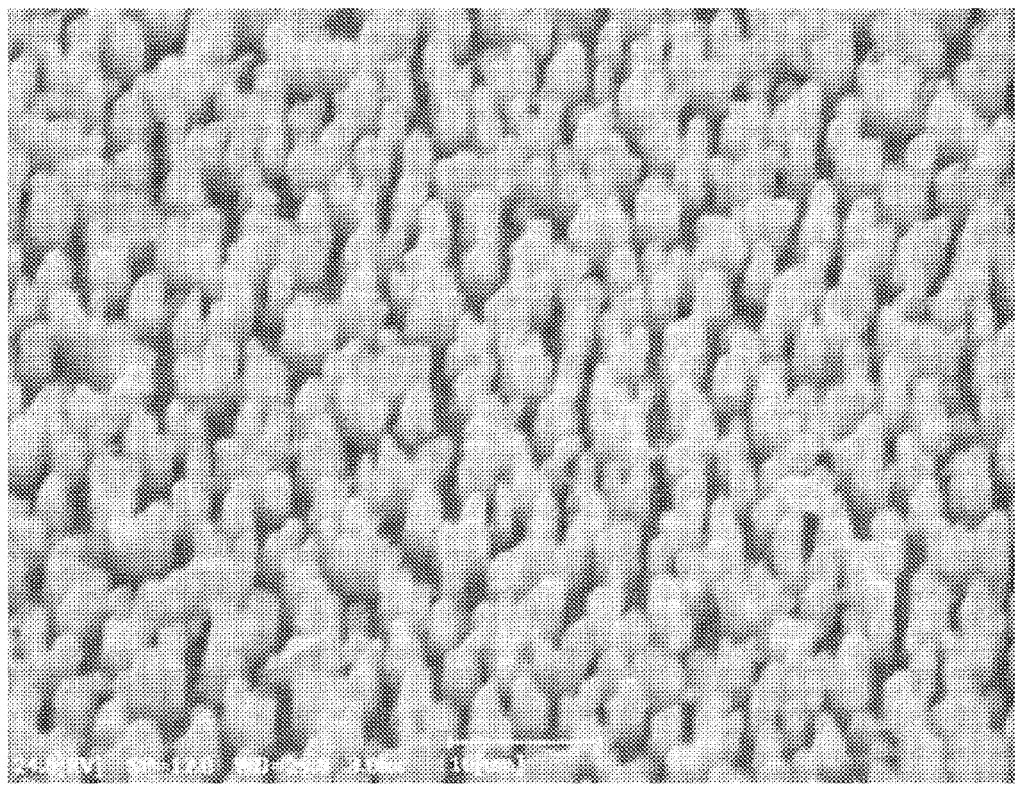
FIG. 3 is a scanning electron micrograph of a glass substrate in which an anti-glare layer is formed according to one embodiment.
Figure 4:
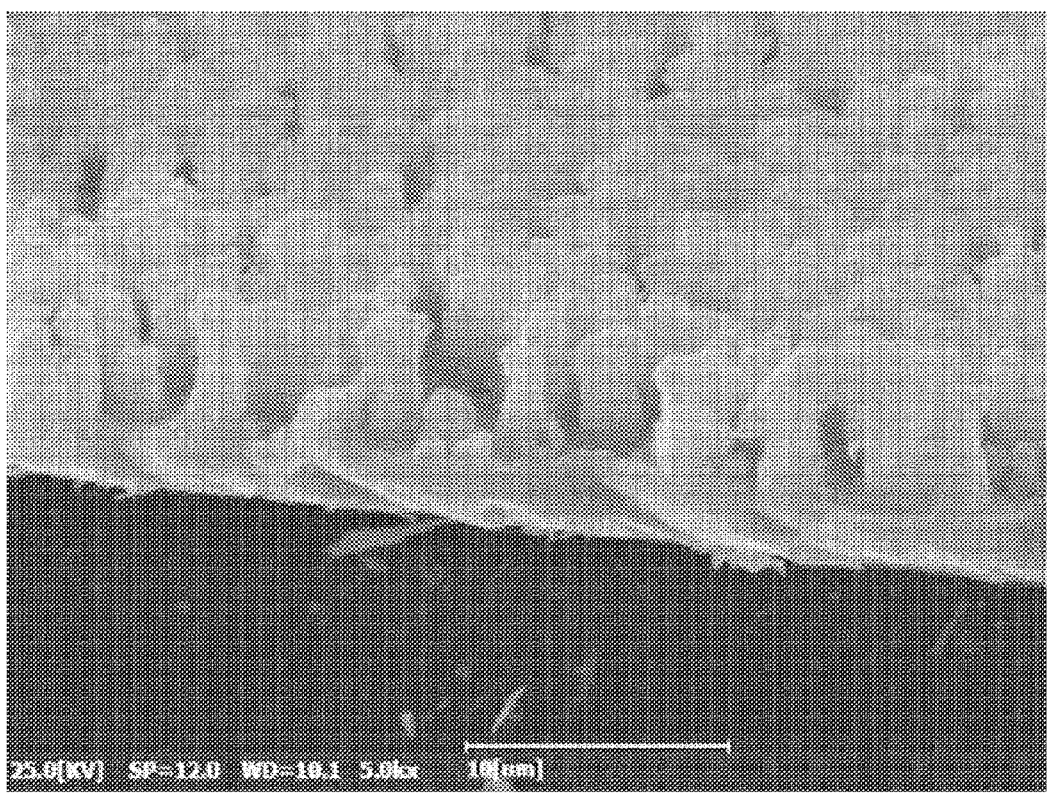
FIG. 4 is an enlarged scanning electron micrograph of FIG. 3.

FIG. 3 is a scanning electron micrograph of a glass substrate in which an anti-glare layer is formed according to one embodiment. Protrusions formed on the glass substrate have a width of several tens of nm to several μm. FIG. 4 is an enlarged scanning electron micrograph of FIG. 3.

Figure 5:
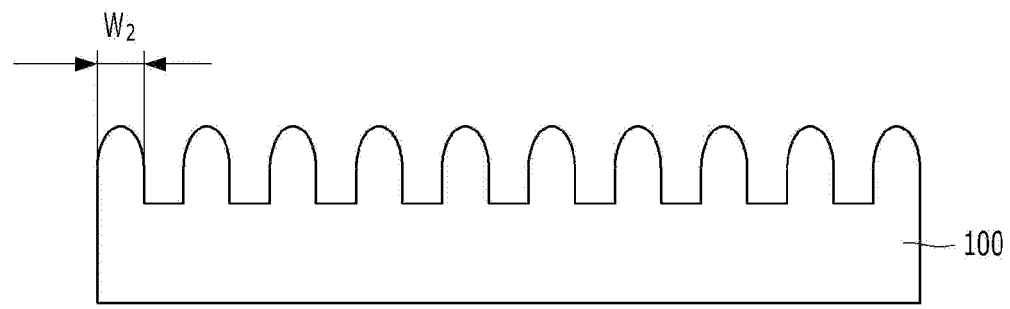
FIG. 5 shows a sectional view of a glass substrate in which an anti-reflective layer is formed according to one embodiment.

FIG. 5 shows a sectional view of a glass substrate in which an anti-reflective layer is formed according to one embodiment.

In one embodiment, the step of forming the protrusions comprises a step of forming an anti-reflective layer including protrusions having a width ($W_2$) of several nm to several tens of nm by wet etching using an acid solution. As shown in FIG. 5, the protrusions include concave and convex surfaces. The width ($W_2$) is the width of the convex surface. If the protrusions having a width ($W_2$) of several nm to several tens of nm are present on the surface of the glass surface, the transmittance of light irradiated on the glass substrate will be increased by the protrusions, and the reflectance of the light will be lowered.

In one embodiment, the acid solution contains fluorine-based acid. Examples of the fluorine-based acid include hydrogen fluoride (HF), ammonium fluoride ($NH_4F$) and the like. By wet etching using the acid solution containing the fluorine-based acid, protrusions having a width of several nm to several tens of nm can be formed on the glass substrate.

In one embodiment, the acid solution contains hydrogen fluoride, and may further contain at least one of ammonium fluoride, phosphoric acid, nitric acid and hydrochloric acid.

In one embodiment, the content of the hydrogen fluoride may be more than 0 wt % and not more than 10 wt % based on 100 wt % of the acid solution.

$$SiO_2 + 6HF \rightarrow H_2SiF_6 + 2H_2O \quad \text{Chemical reaction equation 6}$$

As shown in chemical reaction equation 6 above, silicon dioxide reacts with hydrogen fluoride to cause etching of the surface of the glass substrate, and as a result, protrusions having a width of several nm to several tens of nm are formed on the glass substrate.

In one embodiment, the acid solution contains ammonium fluoride, and the content of the ammonium fluoride may be more than 0 wt % and not more than 5 wt % based on 100 wt % of the acid solution.

$$NH_4F \leftrightarrow NH_3 + HF \quad \text{Chemical reaction equation 7}$$

Although hydrogen fluoride decreases according to the above-described chemical reaction equation 6, hydrogen fluoride is produced according to chemical reaction equation 7. Accordingly, the content of hydrogen fluoride in the acid solution is maintained at a constant level. As the content of hydrogen fluoride is maintained at a constant level, the wet etching process can be stably performed.

In one embodiment, the acid solution contains nitric acid, and the content of the nitric acid may be more than 0 wt % and not more than 5 wt % based on 100 wt % of the acid solution. The nitric acid whose content is more than 0 wt % and not more than 5 wt % based on 100 wt % of the acid solution functions to maintain the size of the protrusions formed by hydrogen fluoride in the range of several nm to several tens of nm.

$$6HNO_3 + Al_2O_3 \rightarrow 2Al(NO_3)_3 + H_2O \quad \text{Chemical reaction equation 8}$$

According to chemical reaction equation 8 above, nitric acid flows into the grooves produced by the etching according to the above-described chemical reaction equation 6, and reacts with aluminum oxide ($Al_2O_3$). According to this reaction, protrusions having a width of several nm to several tens of nm are formed on the glass substrate. As the content of the nitric acid increases in the range of 10 wt % or more to 25 wt % or less based on 100 wt % of the acid solution, protrusions having a greater width of up to several μm can be formed on the glass substrate. On the other hand, the nitric acid whose content is more than 0 wt % and not more than 5 wt % based on 100 wt % of the acid solution maintains the width of the protrusions, formed on the glass substrate, at a constant level in the range of several nm to several tens of nm.

In one embodiment, the acid solution contains phosphoric acid, and the content of the phosphoric acid may be more than 0 wt % and not more than 5 wt % based on 100 wt % of the acid solution.

$$2H_3PO_4 + Al_2O_3 \rightarrow 2Al(PO_4) + 3H_2O \quad \text{Chemical reaction equation 9}$$

According to chemical reaction equation 9 above, phosphoric acid reacts with aluminum oxide ($Al_2O_3$), thereby smoothing the surface of the protrusions having a rough surface. Phosphoric acid is more viscous than nitric acid, and thus can smooth the surface of the protrusions formed according to the chemical reaction of nitric acid.

In one embodiment, the acid solution contains hydrochloric acid, and the content of the hydrochloric acid may be 10 wt % or more and 40 wt % or less based on 100 wt % of the acid solution.

$$SiO_2 + 4HCl \rightarrow SiCl_4 + 2H_2O \quad \text{Chemical reaction equation 10}$$

According to chemical reaction equation 10 above, hydrochloric acid reacts with silicon dioxide ($SiO_2$), thereby smoothing the surface of the protrusions having a rough surface.

In one embodiment, the acid solution contains water, hydrogen fluoride, ammonium fluoride, phosphoric acid, nitric acid and hydrochloric acid. In this case, the content of the hydrogen fluoride may be more than 0 wt % and not more than 10 wt % based on 100 wt % of the acid solution; the content of the ammonium fluoride may be more than 0 wt % and not more than 5 wt % based on 100 wt % of the acid solution; the content of the nitric acid may be more than 0 wt % and not more than 5 wt % based on 100 wt % of the acid solution; the content of the phosphoric acid may be more than 0 wt % and not more than 5 wt % based on 100 wt % of the acid solution; the content of the hydrochloric acid may be 10 wt % or more and 40 wt % or less; and the remainder is water.

By a wet etching process using the acid solution containing the above-described amounts (wt %) of water, hydrogen fluoride, ammonium fluoride, phosphoric acid, nitric acid and hydrochloric acid, protrusions having a width of several nm to several tens of nm are formed on the glass substrate. The water serves to dilute the acid solution.

Figure 6:
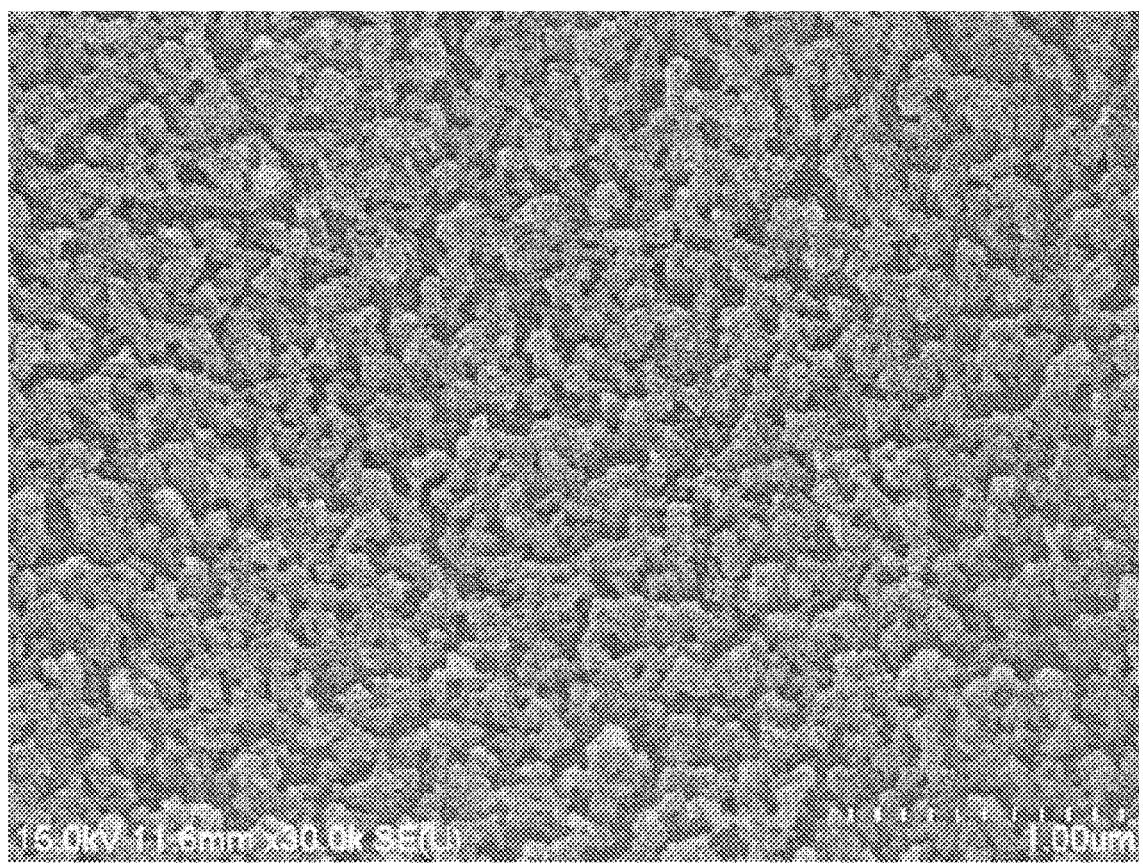
FIG. 6 is a scanning electron micrograph of a glass substrate in which an anti-reflective layer is formed according to one embodiment.
Figure 7:
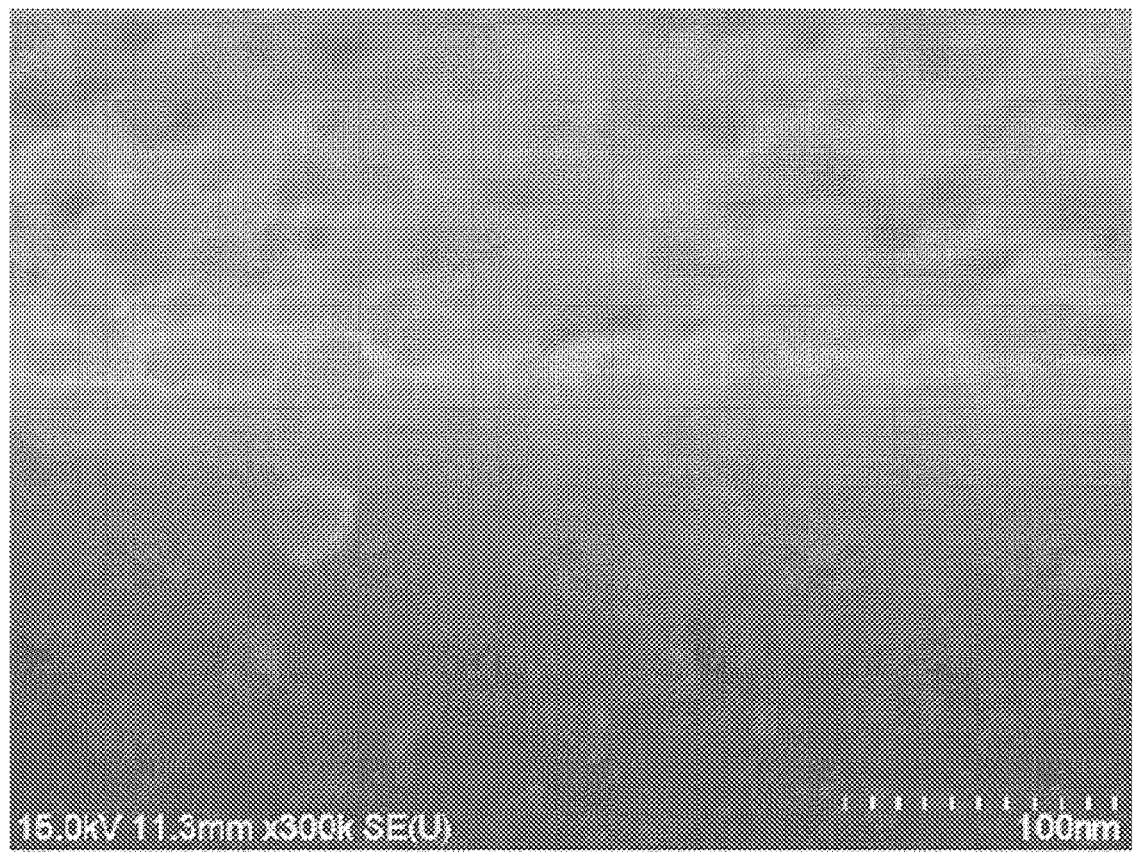
FIG. 7 is an enlarged scanning electron micrograph of FIG. 6.

FIG. 6 is a scanning electron micrograph of a glass substrate in which an anti-reflective layer is formed according to one embodiment. Protrusions formed on the glass substrate have a width of several nm to several tens of nm. FIG. 7 is an enlarged scanning electron micrograph of FIG. 6.

Figure 8:
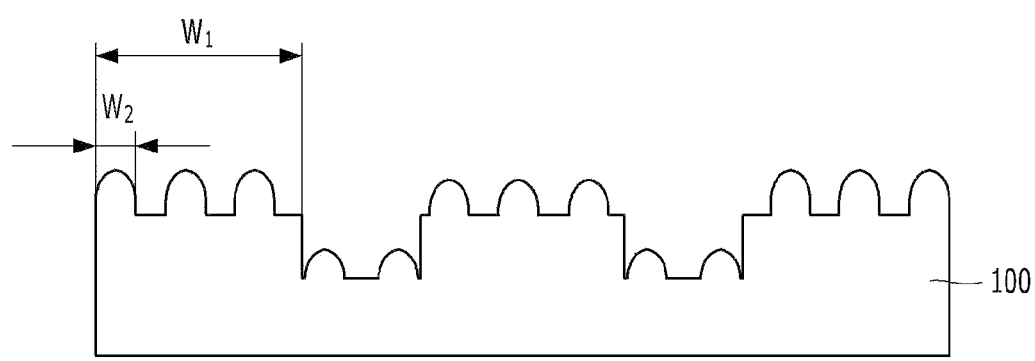
FIG. 8 shows a sectional view of a glass substrate in which both an anti-glare layer and an anti-reflective layer are formed according to one embodiment.

FIG. 8 shows a sectional view of a glass substrate in which both an anti-glare layer and an anti-reflective layer are formed according to one embodiment.

In one embodiment, the step of forming the protrusions comprise the steps of: forming an anti-glare layer including protrusions having a width of several tens of nm to several μm by first wet etching using an acid solution; and forming an anti-reflective layer including protrusions having a width of several nm to several tens of nm on the anti-glare layer by second wet etching using an acid solution.

In the steps of forming anti-glare and anti-reflective layers, an anti-glare layer including protrusions having a width of several tens of nm to several μm are first formed by first etching using an acid solution.

The above-described acid solution contains water, hydrogen fluoride, ammonium fluoride, nitric acid, and hydrochloric acid. In this case, the content of the hydrogen fluoride may be more than 0 wt % and not more than 10 wt % based on 100 wt % of the acid solution; the content of the ammonium fluoride may be more than 0 wt % and not more than 5 wt % based on 100 wt % of the acid solution; the content of the nitric acid may be 10 wt % or more and 25 wt % or less based on 100 wt % of the acid solution; the content of the phosphoric acid may be more than 0 wt % and not more than 5 wt % based on 100 wt % of the acid solution; the content of the hydrochloric acid may be more than 0 wt % and not more than 10 wt % based on 100 wt % of the acid solution; and the remainder is water.

In the steps of forming anti-glare and anti-reflective layers, after the step of forming the anti-glare layer, an anti-reflective layer including protrusions having a width of several nm to several tens of nm are formed on the anti-glare layer by second etching using an acid solution.

The above-described acid solution contains water, hydrogen fluoride, ammonium fluoride, phosphoric acid, nitric acid and hydrochloric acid. In this case, the content of the hydrogen fluoride may be more than 0 wt % and not more than 10 wt % based on 100 wt % of the acid solution; the content of the ammonium fluoride may be more than 0 wt % and not more than 5 wt % based on 100 wt % of the acid solution; the content of the nitric acid may be more than 0 wt % and not more than 5 wt % based on 100 wt % of the acid solution; the content of the phosphoric acid may be more than 0 wt % and not more than 5 wt % based on 100 wt % of the acid solution; the content of the hydrochloric acid may be 10 wt % or more and 40 wt % or less; and the remainder is water.

As the protrusions having a width ($W_1$) of several tens of nm to several μm are formed, the light transmittance and reflectance of the glass substrate decrease. Thereafter, as the protrusions having a width ($W_2$) of several nm to several tens of nm are additionally formed on the protrusions having a width ($W_1$) of several tens of nm to several the transmittance of the glass substrate relatively increases, and the reflectance further decreases. As a result, an anti-glare and anti-reflective glass substrate is produced.

Figure 9:
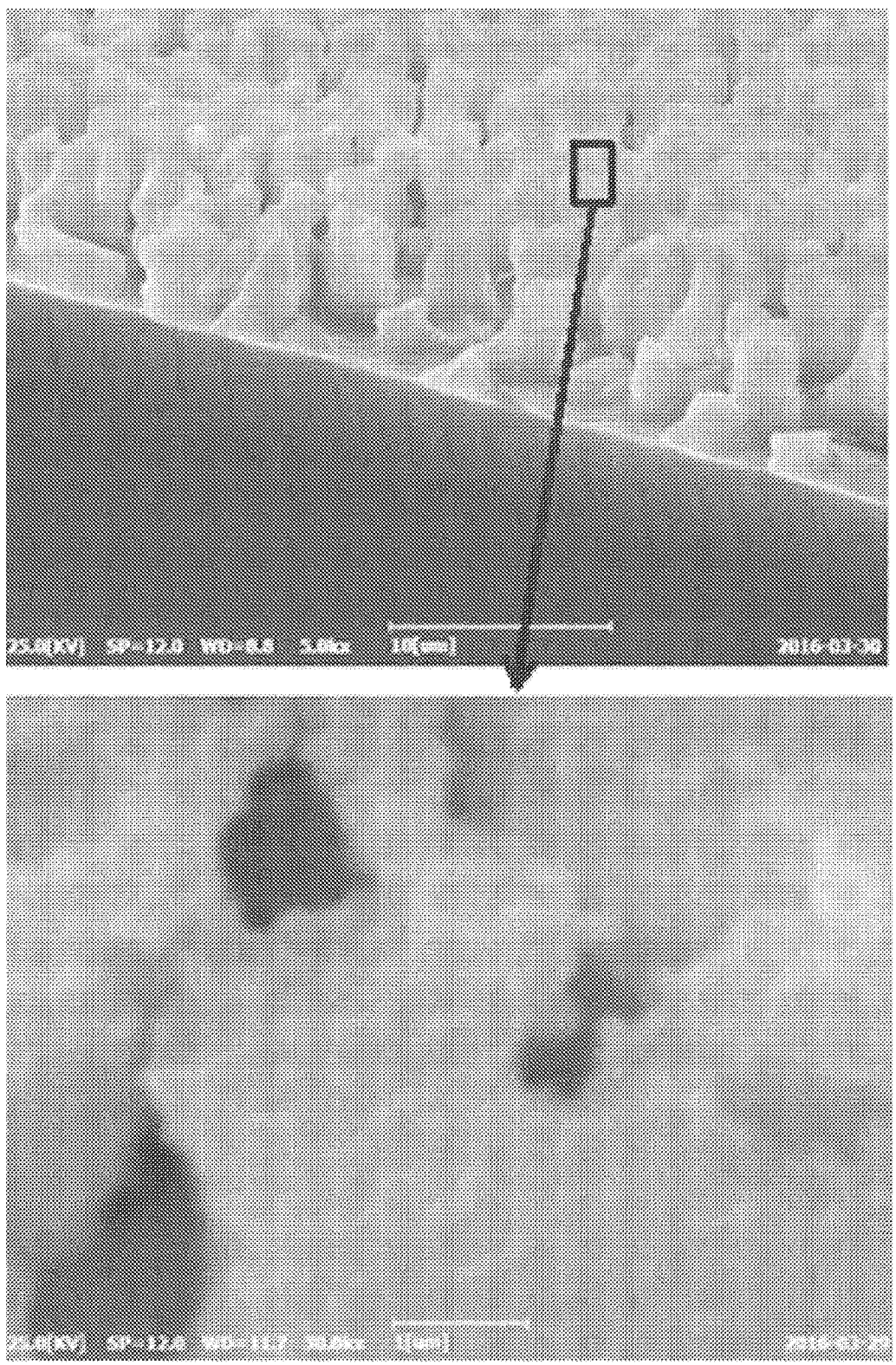
FIG. 9 is a scanning electron micrograph of a glass substrate in which both an anti-glare layer and an anti-reflective layer are formed according to one embodiment.

FIG. 9 is a scanning electron micrograph of a glass substrate in which both an anti-glare layer and an anti-reflective layer are formed according to one embodiment. The photograph at the bottom of FIG. 9 is a further enlarged photograph of the rectangular portion shown at the top of FIG. 9.

Figure 10:
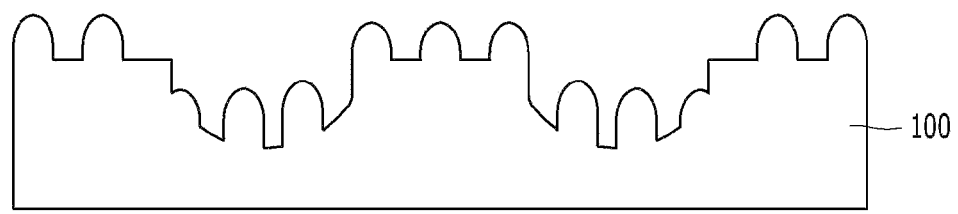
FIG. 10 shows a sectional view of a glass substrate in which an anti-reflective layer is additionally formed on protrusions and grooves having a size of several μm to several hundreds of formed on the glass substrate according to a conventional method which is not the present invention.

FIG. 10 shows a sectional view of a glass substrate in which an anti-reflective layer is additionally formed on protrusions and grooves having a size of several μm to several hundreds of formed on the glass substrate according to a conventional method which is not the present invention.

Figure 11:
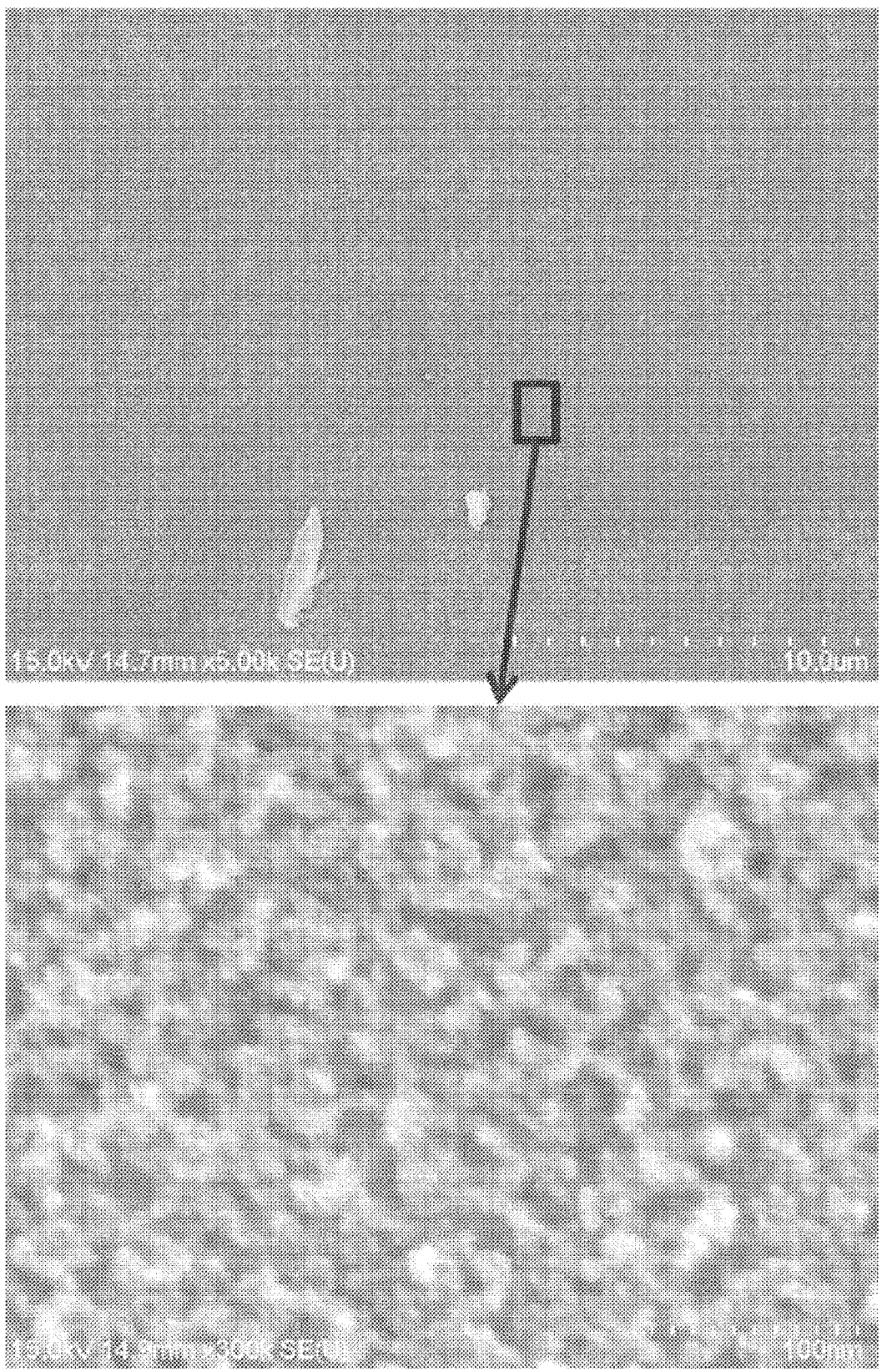
FIG. 11 is a scanning electron micrograph of a glass substrate in which anti-reflective protrusions having a size of several nm to several tens of nm are additionally formed on anti-glare protrusions having a size of several μm to several hundreds of μm.

In one embodiment, the method of the present invention may further comprise a step of additionally forming an anti-reflective layer having a width of several nm to several tens of nm on an anti-glare layer having a size of several μm to several hundreds of formed on a glass substrate according to a conventional method which is not the present invention, by wet etching using an acid solution. FIG. 11 is a scanning electron micrograph of a glass substrate in which anti-reflective protrusions having a size of several nm to several tens of nm are additionally formed on an anti-glare layer including protrusions having a size of several μm to several hundreds of μm, formed according to a conventional method.

The above-described acid solution contains water, hydrogen fluoride, ammonium fluoride, phosphoric acid, nitric acid and hydrochloric acid. In this case, the content of the hydrogen fluoride may be more than 0 wt % and not more than 10 wt % based on 100 wt % of the acid solution; the content of the ammonium fluoride may be more than 0 wt % and not more than 5 wt % based on 100 wt % of the acid solution; the content of the nitric acid may be more than 0 wt % and not more than 5 wt % based on 100 wt % of the acid solution; the content of the phosphoric acid may be more than 0 wt % and not more than 5 wt % based on 100 wt % of the acid solution; the content of the hydrochloric acid may be 10 wt % or more and 40 wt % or less based on 100 wt % of the acid solution; and the remainder is water.

The photograph at the bottom of FIG. 11 is an enlarged scanning electron micrograph of the rectangular portion shown at the top.

From the scanning electron micrographs of FIGS. 6, 9 and 11, it can be seen that, in the base material surface formed by the nano-protrusion method of the present invention, a state in which the protrusions are formed has no regularity in the mutual position of the protrusions and the size or shape of the protrusions, because the protrusions on the surface are formed by wet etching and the wet etching is performed without a process of forming a selective etch-blocking means such as a mask before the etching.

The irregularity of the surface protrusions as described above can be regarded as an inherent characteristic obtained by mask-free wet etching.

Figure 12:
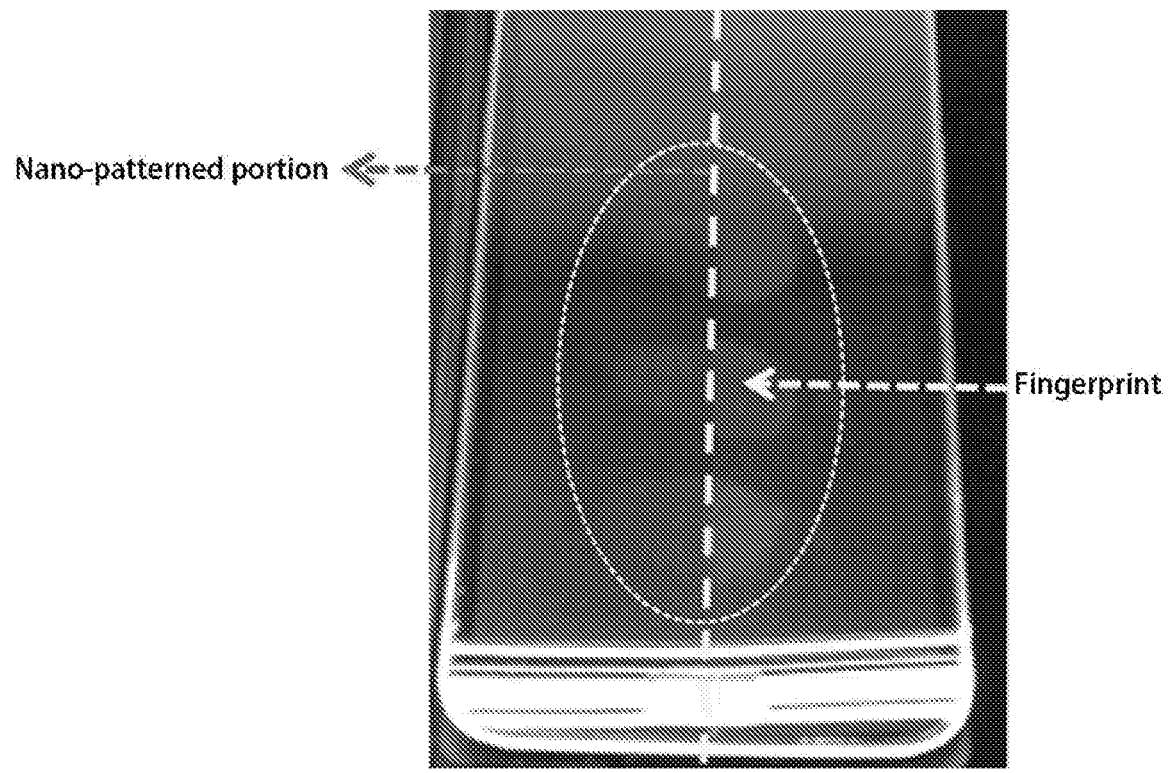
FIG. 12 is a photograph of a smart phone comprising a glass or polymer film in which an anti-reflective layer is formed by a protrusion forming method according to the present invention.

FIG. 12 is a photograph of a smart phone comprising a glass or polymer film in which an anti-reflective layer is formed by the protrusion forming method according to the present invention.

Referring to FIG. 12, the left side of the glass included in the smart phone with respect to the central dotted line has an anti-reflection layer formed by the protrusion forming method according to the present invention. However, the right side of the glass included in the smart phone does not have the anti-reflection layer formed by the protrusion forming method according to the present invention. It can be seen that a fingerprint formed on the left side of the glass is not darker than that on the right side.

Those skilled in the art can appreciate that the present invention may be embodied in other specific forms without departing from the technical idea or essential characteristics thereof. Therefore, it is to be understood that the above-described embodiments are illustrative only and not restrictive of the scope of the present invention. It is also to be understood that the flow charts shown in the figures are merely the sequential steps illustrated in order to achieve the most desirable results in practicing the present invention and that other additional steps may be provided or some steps may be omitted. The scope of the present invention is defined by the appended claims rather than the foregoing detailed description, and it should be interpreted that all changes or modifications derived from the meaning and scope of the claims and equivalents thereof are included within the scope of the present invention.

DESCRIPTION OF REFERENCE NUMERALS

100: glass substrate.

The invention claimed is:

1. A method of forming protrusions on a surface of a base material, the method comprising:
   providing a glass or polymer film substrate base material;
   forming irregularly sized, irregularly shaped, and irregularly positioned nano-protrusions on the surface of the base material by wet etching without selective etch-blocking, wherein forming the nano-protrusions comprises either forming an anti-glare layer including protrusions having a width of several tens of nm to several hundreds of nm by the wet etching using an acid solution, or forming an anti-reflective layer including protrusions having a width of several nm to several tens of nm by the wet etching using an acid solution.

2. The method of claim 1, wherein the acid solution which is used in forming the anti-glare layer contains fluorine-based acid and nitric acid, and the acid solution which is used in forming the anti-reflective layer contains fluorine-based acid.

3. The method of claim 1, wherein the acid solution which is used in forming the anti-glare layer contains hydrogen fluoride and nitric acid, and further contains at least one of ammonium fluoride, phosphoric acid and hydrochloric acid, and the acid solution which is used in forming the anti-reflective layer contains hydrogen fluoride, and further contains at least one of ammonium fluoride, phosphoric acid, nitric acid and hydrochloric acid.

4. The method of claim 1, wherein the acid solution which is used in forming the anti-glare layer comprises, based on 100 wt % of the acid solution, 10 wt % or less of hydrogen fluoride, 5 wt % or less of ammonium fluoride, 10 wt % or more to 25 wt % or less of nitric acid, 5 wt % or less of phosphoric acid, 10 wt % or less of hydrochloric acid, and the remainder being water.

5. The method of claim 1, wherein the acid solution which is used in forming the anti-reflective layer comprises, based on 100 wt % of the acid solution, 10 wt % or less of hydrogen fluoride, 5 wt % or less of ammonium fluoride, 5 wt % or less of nitric acid, 5 wt % or less of phosphoric acid, 10 wt % or more to 40 wt % or more of hydrochloric acid, and the remainder being water.

6. The method of claim 1, wherein forming the nano-protrusions comprises: forming an anti-glare layer including protrusions having a width of several tens of nm to several hundreds of nm by first wet etching using an acid solution; and forming an anti-reflective layer including protrusions having a width of several nm to several tens of nm on the anti-glare layer by second wet etching using an acid solution.

7. The method of claim 3, wherein the content of hydrogen fluoride in the acid solution is 10 wt % or less.

8. The method of claim 7, wherein when forming the anti-glare layer, the content of nitric acid in the acid solution is 10 wt % or more and 25 wt % or less, and when forming the anti-reflective layer, the content of the nitric acid in the acid solution is 5 wt % or less.

9. The method of claim 3, wherein the acid solution contains ammonium fluoride or phosphoric acid, and the content of the ammonium fluoride or the phosphoric acid is 5 wt % or less.

10. The method of claim 7, wherein when forming the anti-glare layer, the content of hydrochloric acid in the acid solution is 10 wt % or less, and when forming the anti-reflective layer, the content of the hydrochloric acid in the acid solution is 10 wt % or more and 40% wt or less.

\* \* \* \* \*